US005799240A

United States Patent [19]

Miyashita

[11] Patent Number: 5,799,240

[45] Date of Patent: Aug. 25, 1998

[54] RADIO COMMUNICATION DEVICE COMBINABLE WITH A RADIO MODEM FOR COMPUTER

[75] Inventor: Yukio Miyashita, Tokyo, Japan

[73] Assignee: NEC Corporation, Tokyo, Japan

[21] Appl. No.: 364,458

[22] Filed: Dec. 27, 1994

[30] Foreign Application Priority Data

Dec. 24, 1993 [JP] Japan .................................... 5-326785

[51] Int. Cl.$^{6}$ .................................................. H04B 1/08

[52] U.S. Cl. ........................... 455/38.4; 455/90; 455/349; 455/351; 340/825.44

[58] Field of Search .................................... 74/66, 89, 90, 74/347, 348, 349, 351, 352, 38.1, 38.3, 38.4, 38.5; 379/57, 58, 98, 96; 340/825.44; 455/558, 575

[56] References Cited

U.S. PATENT DOCUMENTS

| | | | |
|---|---|---|---|
| 4,766,434 | 8/1988 | Matai et al. | 455/38.4 X |
| 4,879,759 | 11/1989 | Matsumoto et al. | 455/348 |
| 5,043,721 | 8/1991 | May | 340/825.44 |
| 5,105,189 | 4/1992 | Murai et al. | 340/825 |
| 5,258,751 | 11/1993 | DeLuca et al. | 455/38.4 X |
| 5,302,947 | 4/1994 | Fuller et al. | 340/825.44 X |
| 5,353,017 | 10/1994 | Suzuki et al. | 455/348 X |
| 5,361,061 | 11/1994 | Mays et al. | 455/348 X |
| 5,371,899 | 12/1994 | Kuzuicki et al. | 455/38.1 X |
| 5,387,904 | 2/1995 | Takada | 379/57 X |
| 5,418,524 | 5/1995 | Fennell | 340/825.22 |
| 5,535,434 | 7/1996 | Siddoway et al. | 455/349 X |
| 5,550,861 | 8/1996 | Chan et al. | 455/38.2 X |

FOREIGN PATENT DOCUMENTS

| | | | |
|---|---|---|---|
| 0434231 | 6/1991 | European Pat. Off. . | |
| 3262069 | 11/1991 | Japan | G06F 15/02 |
| 9013213 | 11/1990 | WIPO . | |
| 9409461 | 4/1994 | WIPO . | |

*Primary Examiner*—Reinhard J. Eisenzopf
*Assistant Examiner*—Philip J. Sobutka
*Attorney, Agent, or Firm*—Sughrue, Mion, Zinn, Macpeak & Seas, PLLC

[57] ABSTRACT

A radio modem for a computer receives a calling signal and stores a message included in the calling signal. A case is connected to the radio modem electrically through connection parts. The case is supplied the message from the radio modem via the connection parts and displays the message on the display.

30 Claims, 5 Drawing Sheets

FIG. 2a
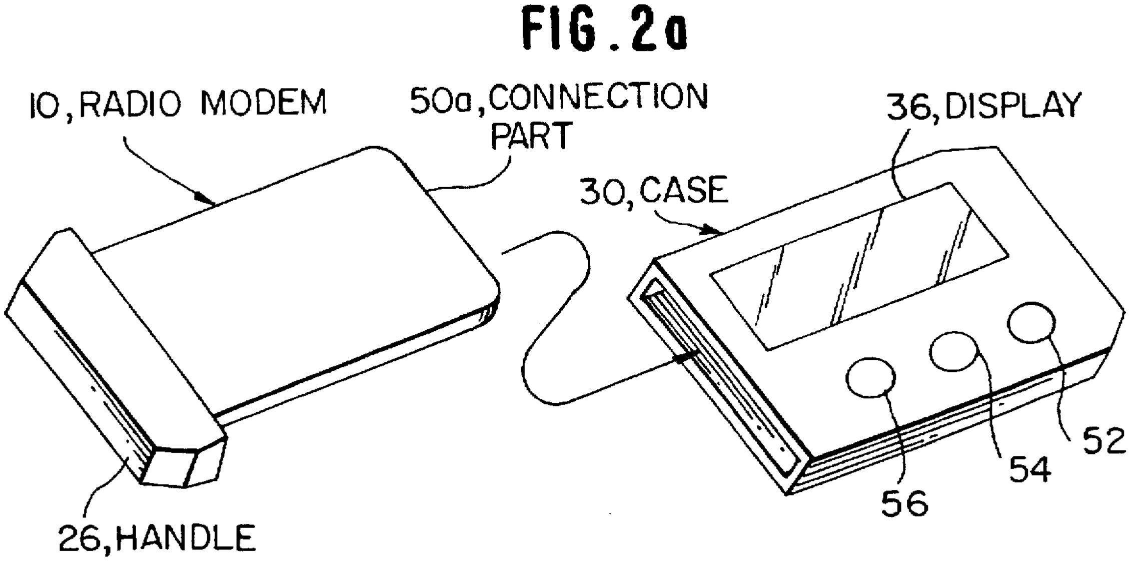
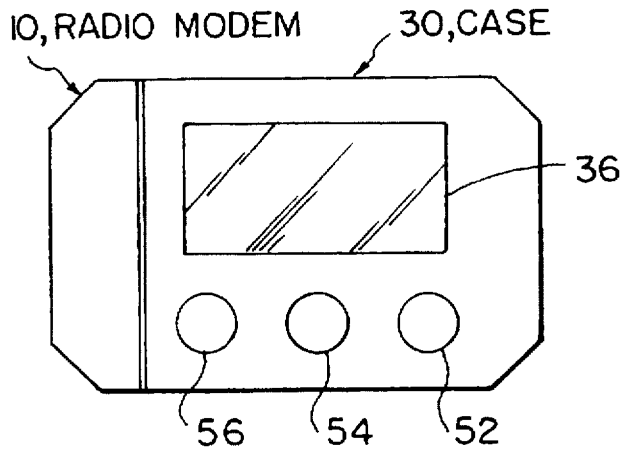
FIG. 2b
FIG. 3a
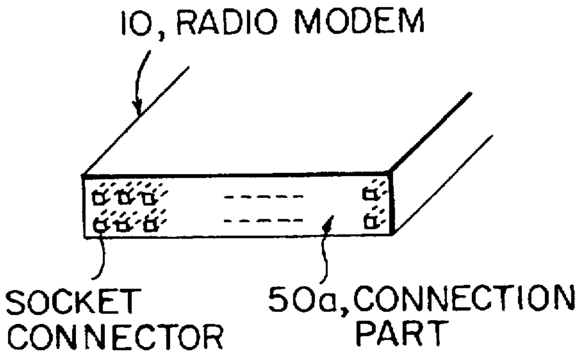
FIG. 3b
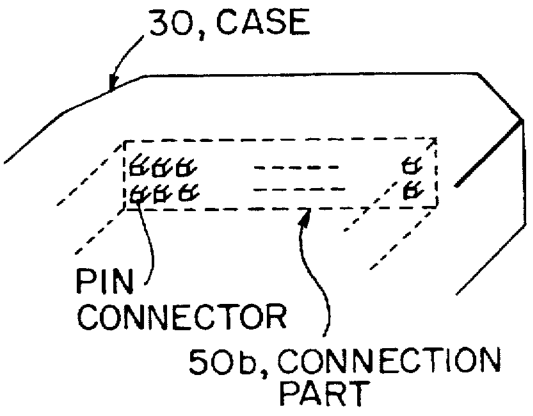

FIG.6a
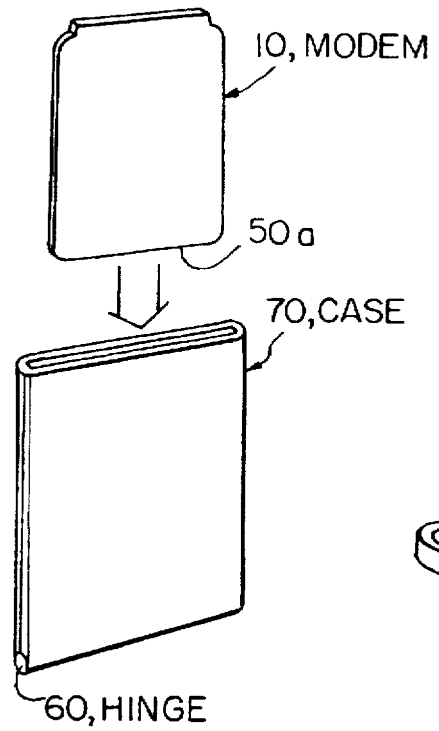
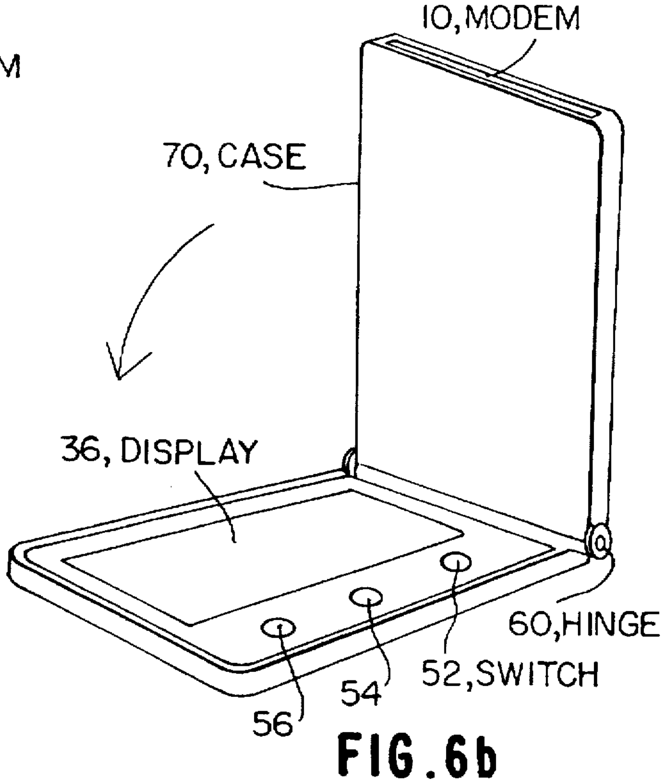
FIG.6b
FIG.7
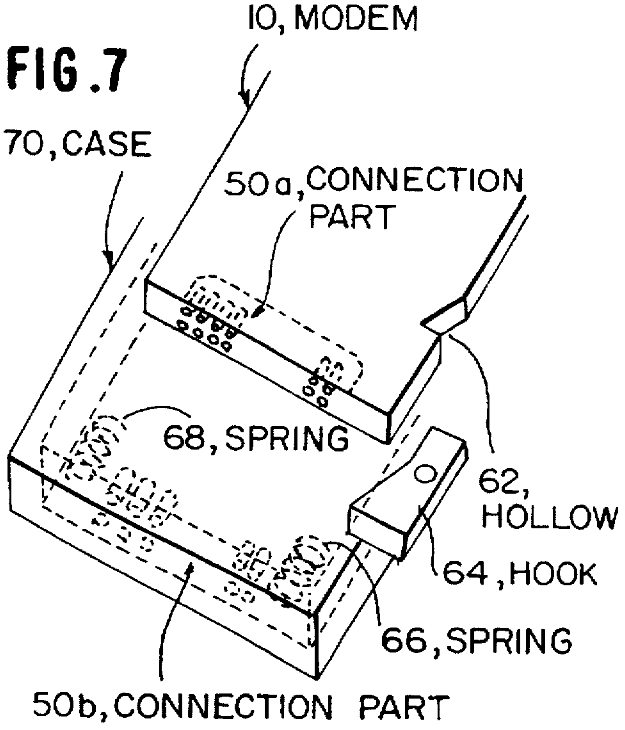
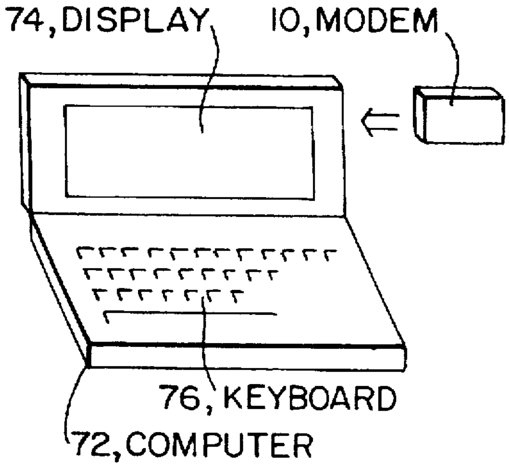
FIG.8

RADIO COMMUNICATION DEVICE COMBINABLE WITH A RADIO MODEM FOR COMPUTER

BACKGROUND OF THE INVENTION

1. Field of the Invention

The present invention relates to a radio communication device, and more particularly, to a radio communication device combinable with a radio modem for a computer.

2. Description of the Related Art

The communication to a computer utilizing a paging system is performed by letting the computer receive radio selective calling signals through a small-sized radio modem connected to the computer. The computer takes in the radio selective calling signals with an identification (ID) number which coincides with an ID number assigned to the modem. When a user carries the modem without the computer, the modem receives the radio selective calling signals and stores messages included in the received signals into a built-in memory. In addition, the modem informs the user of receiving the selective calling signals. Such system having a modem with a computer is disclosed in, for example, Japan Laid-Open Patent Application No. 262069/1991 (JP-A-03-262069).

However, since the modem does not have a display unit, the user cannot confirm the received message when the MODEM is separated from the computer and the selective calling signal is received. As a result, the user must wait until the modem is connected to the computer to see the received message. Moreover, since the modem does not have a message deletion function in addition to lack of the display unit, messages are not stored in the built-in memory of the modem after the memory capacity has been exhausted. Consequently, the user cannot confirm the receipt of some messages.

Furthermore, the modem has poor portability and insufficient strength due to the fact that connection terminals of the modem have a shape and size, such as in Model No. PCMCIA II, uniquely adaptable for connection to the computer.

SUMMARY OF THE INVENTION

It is therefore an object of the present invention to provide a carrying case combinable with a radio modem for a computer.

Another object of the present invention is to provide a radio communication device combinable with a radio modem for a computer capable of displaying a received message when a user carries the radio modem.

It is further object of the present invention to provide a radio communication device combinable with a radio modem for a computer capable of deleting an unwanted message.

It is still further object of the present invention to provide a carrying case in which portability of radio modem for a computer is superior.

According to the present invention, a radio modem for a computer includes a first connection part electrically connected to the computer. A case includes a second connection part electrically connected to the first connection part of the radio modem. The radio modem and the case is operated as a radio communication device when the radio modem and the case are connected electrically. In addition, the case includes an operating portion, a display for displaying a received message, and a controller for controlling the radio modem based on an operation of the operating portion and for supplying a signal from the radio modem to the display via the first and second connection parts.

The radio modem includes a radio section for receiving a radio signal, a decoder for decoding the radio signal to a decoded signal, a first memory for storing an assigned calling number, a second memory for storing the received message included in the decoded signal, and a CPU for comparing a received calling number included in the decoded signal with the assigned calling number and for communicating with the controller in the case via the first and second connection parts. Moreover, the case includes deleting means for deleting the received message in the second memory in response to the operation of the operating portion.

BRIEF DESCRIPTION OF THE DRAWINGS

The above and other objects, features and advantages of this invention will become more apparent from the following detailed description taken with the accompanying drawings in which:

FIGS. 2(*a*) and 2(*b*) illustrate external views of a selective calling receiver of the preferred embodiment shown in FIG. 1;

FIGS. 3(*a*) and 3(*b*) illustrate external views of the connection parts shown in FIG. 1;

FIGS. 6(*a*) and 6(*b*) illustrate external views of an another preferred embodiment according to the present invention; and FIG. 7 illustrates a mechanism of fixing a radio modem to the carrying case shown in FIGS. 6(*a*) and 6(*b*); and FIG. 8 illustrates a computer and a radio modem inserted into the computer.

In the drawings, the same reference numerals denote the same structural elements.

DESCRIPTION OF THE PREFERRED EMBODIMENT

Figure 1:
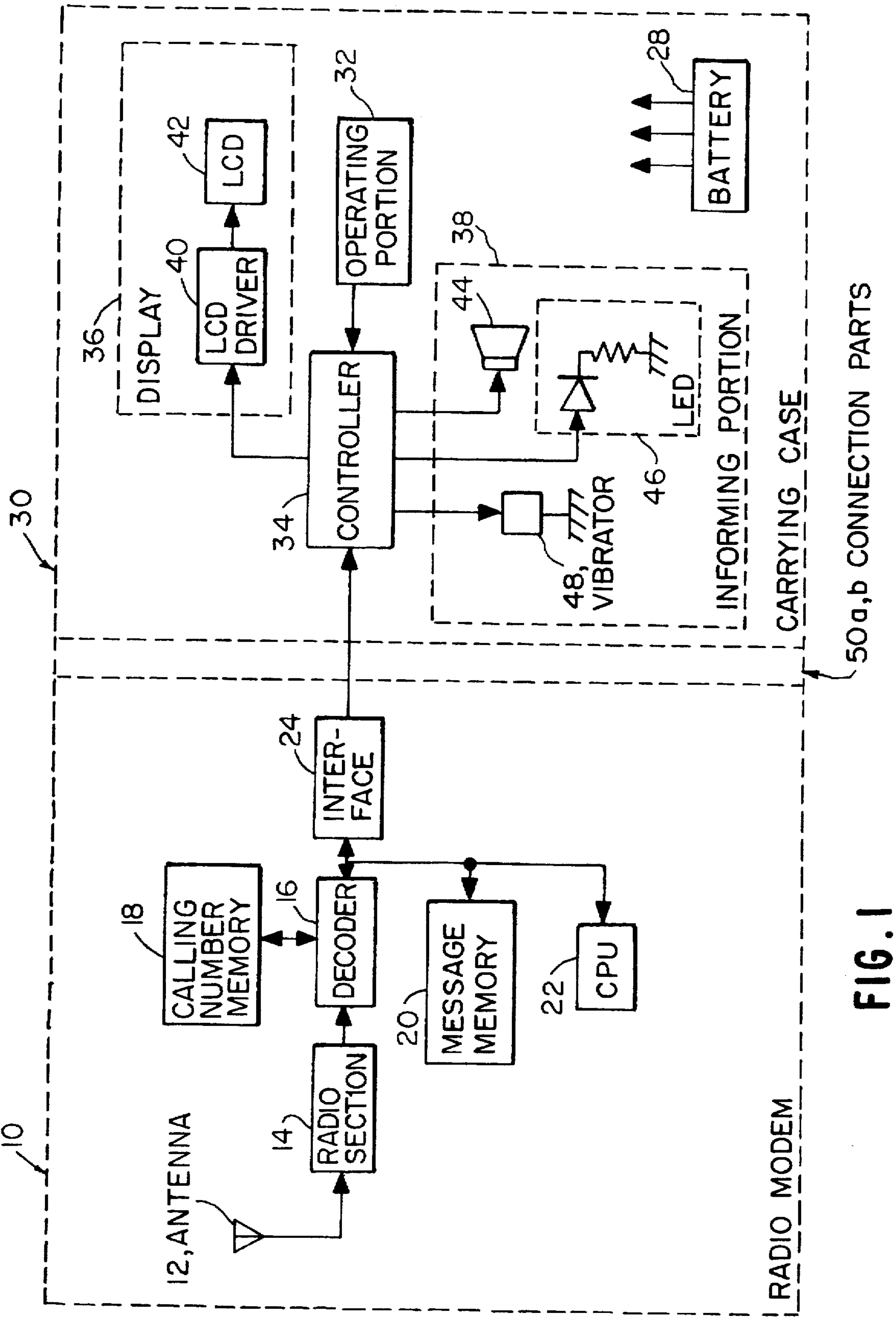
FIG. 1 is a block diagram of a preferred embodiment according to the present invention.

FIG. 1 is a block diagram of a preferred embodiment according to the present invention. In FIG. 1, a selective calling receiver consists of a radio modem 10 and a carrying case 30 to which the modem 10 is inserted. The modem 10 and the carrying case 30 are connected by means of connection parts 50*a* and 50*b*, such as PCMCIA II connection terminals.

The radio modem 10 is equipped with an antenna 12, a radio section 14, a decoder 16, a calling number memory 18, a message memory 20, a CPU 22, an interface for PCMCIA 24, and the connection part 50*a*. The carrying case 30 is equipped with a battery 28, an operating portion 32, a controller 34, a display 36, an informing portion 42, and the connection part 50*b*. The display 36 includes an LCD driver 38 and an LCD 40. The informing portion 42 includes a speaker 44, an LED 46, and a vibrator 48. The battery 28 supplies a power voltage to each of the circuits.

FIG. 2(*a*) is an external view of the radio modem 10 and the carrying case 30 shown in FIG. 1, and FIG. 2(*b*) is an external view where the modem 10 is inserted into the carrying case 30. As shown in FIGS. 2(*a*) and 2(*b*), the selective calling receiver of the type combinable with a radio modem for computer of the preferred embodiment according to the present invention is formed in the shape of a box. In addition, the radio modem 10 has a handle 26 to inserting or pulling the radio modem 10 to or from the carrying case 30.

In FIG. 2, the carrying case 30 includes switches 52, 54 and 56 which constitute the operating portion 32 as shown in FIG. 1. A set switch 52 is used, for example, for stopping an informing operation, a display start, or executing a message deletion. A mode switch 54 is used, for example, for selecting modes. A select switch 56 is used, for example, for message selection.

FIGS. 3(*a*) and 3(*b*) illustrate external views, respectively, of a first connection part 50*a* of the radio modem 10 and a second connection part 50*b* of the carrying case 30. The first connection part 50*a* is constituted by a plurality of socket connectors and the second connection part 50*b* is constituted by a plurality of pin connectors to which the socket connectors are inserted.

For example, as prescribed for PCMCIA connectors, thirty-four (34) socket connectors are lined up in two files and, similarly, thirty-four (34) pin connectors are lined up in two files. Functions of each pin are shown in the following table 1.

tion between the radio modem 10 and the carrying case 30. Connectors VCC are used for a power supply from the battery 28.

Figure 4:
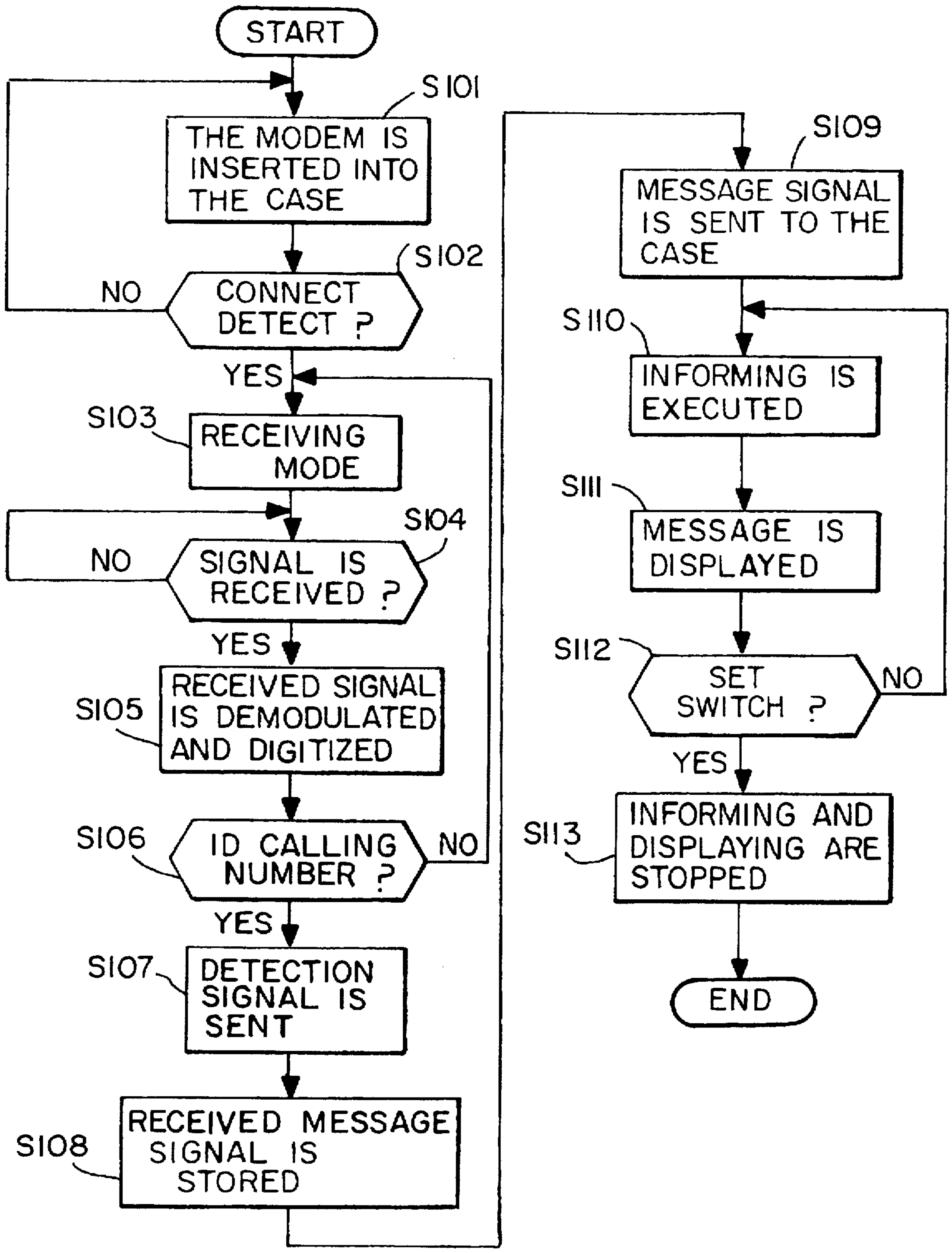
FIG. 4 is a flow-chart illustrating the receiving and informing operation according to the present invention.

Next, a receiving and informing operation will be described with reference to FIGS. 1 to 4. FIG. 4 is a flow-chart illustrating the receiving and informing operation according to the present invention.

When the radio modem 10 is inserted into the carrying case 30 (Step S101 in FIG. 4), it is detected whether or not the socket connectors of the modem 10 is connected to the pin connectors of the case 30 using the connectors CD1 and CD2 (Step S102). If it is detected that the modem 10 is connected to the case 30, the selective calling receiver moves into a receiving mode (Step S103). If it is not detected, it waits for the modem insertion by a user again.

In the receiving mode, when a radio signal is received (Step S104), the radio signal received by the antenna 12 in the radio modem 10 for a computer (not shown) is demodulated in the radio section 14, and the demodulated signal is waveform-shaped and converted to a digital signal (Step S105). The decoder 16 compares an assigned calling number in the calling number memory 18 with a received calling number included in the digital signal (Step S106), and sends a detection signal to the CPU 22 when both of the calling numbers coincide (Step S107). The CPU 22 may be a model TEC 1000 made by Texas Instruments. If the assigned

TABLE 1

| PIN | SIGNAL | FUNCTION | PIN | SIGNAL | FUNCTION |
|---|---|---|---|---|---|
| 1 | GND | GROUND | 35 | GND | GROUND |
| 2 | D3 | DATA 3 | 36 | –CD1 | CARD DETECT |
| 3 | D4 | DATA 4 | 37 | D11 | DATA 11 |
| 4 | D5 | DATA 5 | 38 | D12 | DATA 12 |
| 5 | D6 | DATA 6 | 39 | D13 | DATA 13 |
| 6 | D7 | DATA 7 | 40 | D14 | DATA 14 |
| 7 | –CE1 | CARD ENABLE | 41 | D15 | DATA 15 |
| 8 | A10 | ADDRESS 10 | 42 | –CE2 | CARD ENABLE |
| 9 | –OE | OUTPUT ENABLE | 43 | RFSH | REFRESH |
| 10 | A11 | ADDRESS 11 | 44 | RFU | RESERVE |
| 11 | A9 | ADDRESS 9 | 45 | RFU | RESERVE |
| 12 | A8 | ADDRESS 8 | 46 | A17 | ADDRESS 17 |
| 13 | A13 | ADDRESS 13 | 47 | A18 | ADDRESS 18 |
| 14 | A14 | ADDRESS 14 | 48 | A19 | ADDRESS 19 |
| 15 | –WE/–PGM | WRITE ENABLE | 49 | A20 | ADDRESS 20 |
| 16 | +RDY/–BSY | READY/BUSY | 50 | A21 | ADDRESS 21 |
| 17 | VCC | VOLTAGE | 51 | VCC | ADDRESS 20 |
| 18 | VPP1 | VOLTAGE FOR PROGRAM | 52 | VPP2 | ADDRESS 21 |
| 19 | A16 | ADDRESS 16 | 53 | A22 | ADDRESS 22 |
| 20 | A15 | ADDRESS 15 | 54 | A23 | ADDRESS 23 |
| 21 | A12 | ADDRESS 12 | 55 | A24 | ADDRESS 24 |
| 22 | A7 | ADDRESS 7 | 56 | A25 | ADDRESS 25 |
| 23 | A6 | ADDRESS 6 | 57 | RFU | RESERVE |
| 24 | A5 | ADDRESS 5 | 58 | +RESET | RESET |
| 25 | A4 | ADDRESS 4 | 59 | –WAIT | WAIT |
| 26 | A3 | ADDRESS 3 | 60 | RFU | RESERVE |
| 27 | A2 | ADDRESS 2 | 61 | –REG | SELECT |
| 28 | A1 | ADDRESS 1 | 62 | BVD2 | VOLTAGE DETECT |
| 29 | A0 | ADDRESS 0 | 63 | BVD1 | VOLTAGE DETECT |
| 30 | D0 | DATA 0 | 64 | D8 | DATA 8 |
| 31 | D1 | DATA 1 | 65 | D9 | DATA 9 |
| 32 | D2 | DATA 2 | 66 | D10 | DATA 10 |
| 33 | +WP | WRITE PROTECT | 67 | –CD2 | CARD DETECT |
| 34 | GND | GROUND | 68 | GND | GROUND |

Connectors Ds are for receiving and sending messages and connectors As are for detecting a switch operation. Connectors CD1 and CD2 are used for detecting a conneccalling number does not coincide with the received calling number, the selective calling receiver returns to the receiving mode. After sending the detection signal, the decoder 16 sends a received message signal to the message memory 20 (Step S108) and the PCMCIA interface 24. In response, the PCMCIA interface 24 sends the received message signal to the controller 34 in the carrying case 30 via the connection parts 50*a* and 50*b* (Step S109). Preferably, the connectors Ds of the connection parts 50*a* and 50*b* are used for the received message signal.

The controller 34 informs the user of a signal reception by driving one of the informing portion 38 (Step S110) and drives the LCD driver 40 to display the received message on the LCD 42 (Step S111). If the set switch 52 (FIG. 2) in the operating portion 32 is depressed by the user (Step S112), the controller 34 stops displaying the received message and informing the user of the signal reception (Step S113). If the set switch 52 is not depressed, the received message display and informing operation is continued.

Figure 5:
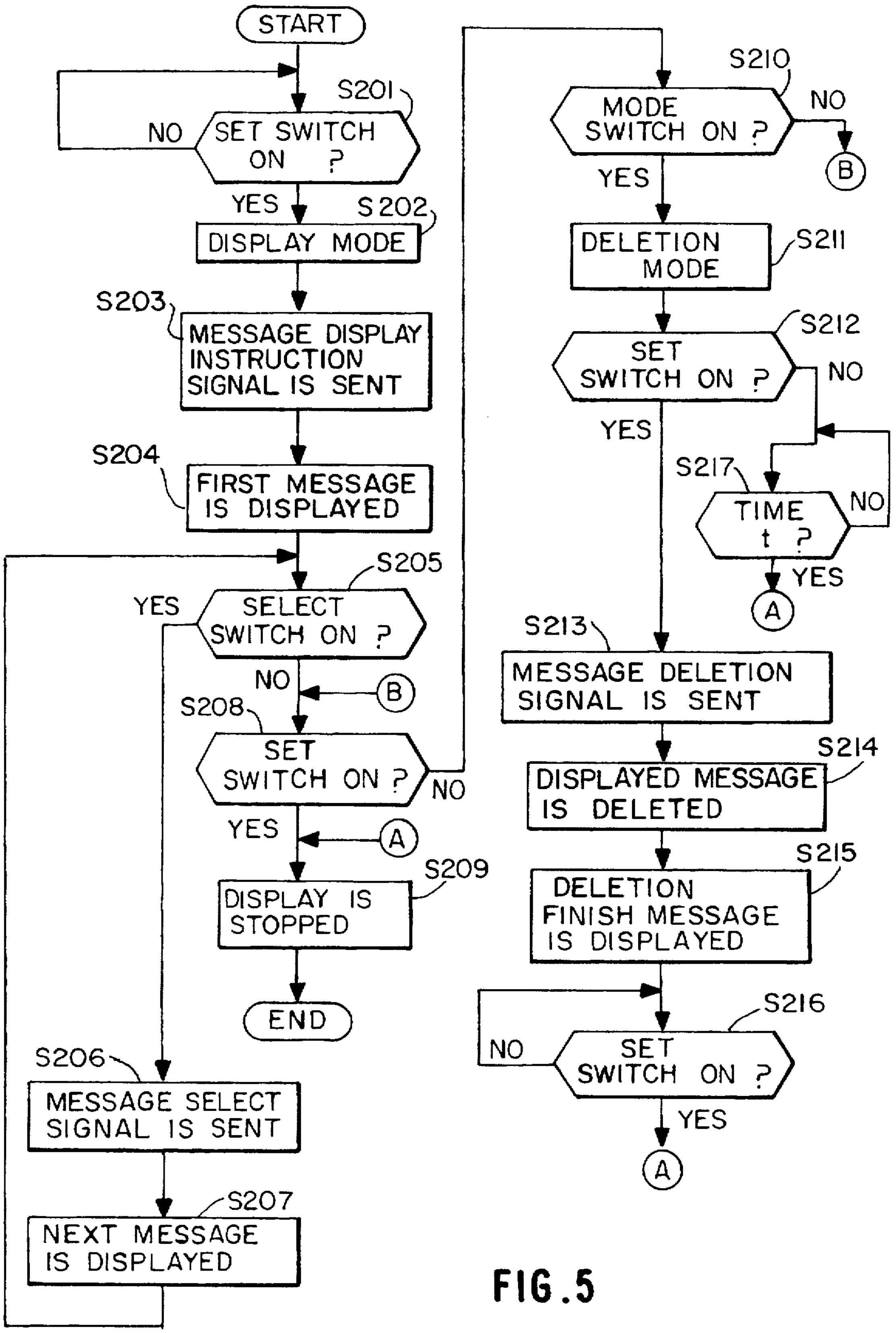
FIG. 5 is a flow-chart illustrating the operations of displaying the stored messages and of deleting an unwanted message according to the present invention.

Next, the operations of displaying the stored message and of deleting an unwanted message will be described with reference to FIGS. 1 to 3 and 5. FIG. 5 is a flow-chart illustrating the operations of displaying the stored messages and of deleting an unwanted message.

When the set switch 52 (FIG. 2) is depressed (Step S201 in FIG. 5), it becomes a display mode (Step S202) and a message display instruction signal is sent to the CPU 22 from the controller 34 via connectors As of the connection parts 50*a* and 50*b* and the interface 24 (Step S203). In response, the CPU 22 causes a first stored message in the message memory 20 to send to the controller 34 via the interface 25 and connectors Ds of the connection parts 50*a* and 50*b* and to display the first message on the display 36 (Step S204). If the displayed first message is not a desired message for the user, i.e., the select switch 56 is depressed (Step S205), a message select signal is sent from the controller 34 to the CPU 22 via the connectors As and the interface 24 (Step S206). In response, the CPU 22 causes the next message signal to send the controller 34 similar to the first message signal and to display the second message on the display 36 (Step S207). These steps S205 to S207 are repeated until the desired message is displayed.

After the desired message is displayed, if the set switch 52 is depressed (Step S208), the controller 34 sends a display stop signal to the CPU 22 via the connectors As and the interface 24 and the message display operation is stopped (Step S209).

When the set switch is not depressed in Step S208, it is detected whether the mode switch 54 is depressed or not (Step S210). If the mode switch 54 is depressed (Step S210), i.e., the displayed message is an unwanted message, the display mode is changed to the message deletion mode (Step S211). If the mode switch 54 is not depressed, the step returns to Step S208. In the message deletion mode, when the set switch 52 is depressed (Step S212), the controller 34 sends a message deletion signal to the CPU 22 via the connectors As and the interface 24 (Step S213). In response, the CPU 20 deletes the displayed message from the message memory 20 (Step S214). After the displayed message is deleted, a deletion finish signal is sent from a memory in the controller 34 to the display 36, and a message indicating the deletion finish is displayed on the display 36 (Step S215). If the set switch 52 is depressed after the message deletion (Step S216), the step follows Step S209.

In Step 212, if the set switch 52 is not depressed, it is detected whether or not a predetermined time t elapsed (Step S217). When the predetermined time t elapsed from entering the deletion mode, the step follows Step S209.

FIGS. 6(*a*) and 6(*b*) illustrate external views of an another preferred embodiment according to the present invention. In FIG. 6, a shape of a carrying case 70 is different from that of the carrying case 30 shown in FIG. 2. The carrying case 70 has a folding mechanism by means of a hinge 60. FIG. 6(*a*) illustrates an external view of condition in which the carrying case 70 is closed and FIG. 6(*b*) illustrates an external view of condition in which the carrying case 70 is opened.

FIG. 7 illustrates a mechanism of fixing a radio modem to a carrying case. The radio modem 10 has a hollow 62 on one side of the radio modem 10. When the radio modem 10 is inserted into the carrying case 70, the hollow 62 of the radio modem 10 is fixed to a hook 64 of the carrying case 70. The hook 64 of the carrying case 70 is provided at a position of fixing with the hollow 62 of the radio modem 10. When the radio modem 10 is removed from the carrying case 70, the hook 64 is disconnected from the hollow 62 and the radio modem 10 is pushed by a power of springs 66 and 68 of the carrying case 70. The springs 66 and 68 are set on a face of pin connectors on the carrying case 70.

FIG. 8 illustrates a computer and a radio modem thereof. A computer 72 has a display 74 and a key board 76. A radio modem 10 is inserted in the computer 72.

Although the battery 28 is set in the carrying case 30 in FIG. 1, the battery is equipped in the radio modem 10. In addition, unused connectors of the connection parts 50*a* and 50*b* may be selected freely for communication between the radio modem and the carrying case.

As described hereinbefore, according to the present invention, since a radio modem for a computer is installed in a carrying case including a display, it is possible for a user to use the radio modem as a selective calling receiver and to confirm a received message when a user carries the radio modem.

Moreover, it is possible to make an effective use of the limited capacity of a memory in the radio modem by deleting an unwanted message, and prevent the generation of messages that cannot be confirmed.

Furthermore, it is possible to complement the poor portability and insufficient strength of the radio modem for a computer.

Although the embodiment has been described with respect to a case in which the modification was based on a specific arrangement, it goes without saying that the present invention is not restricted to this case.

What is claimed is:

1. A radio communication device, comprising:

a radio modem for a computer having a first connection part electrically connectable to said computer; and a case having a second connection part electrically connectable to said first connection part of said radio modem when said radio modem is separated from said computer, wherein said case is other than a general-purpose computer;

wherein said radio modem and said case operate as said radio communication device when said radio modem and said case are connected electrically, and wherein said radio communication device automatically goes into a signal receiving mode in response to connection of said radio modem to said case.

2. The radio communication device as claimed in claim 1, wherein said radio communication device is a paging receiver.

3. The radio communication device as claimed in claim 1, wherein said radio modem comprises:

a radio section for receiving a radio signal;

a decoder for decoding said radio signal to a decoded signal;

a first memory for storing an assigned calling number;

a second memory for storing said received message included in said decoded signal; and a CPU for comparing a received calling number included in said decoded signal with said assigned calling number and for communicating with said controller in said case via said first and second connection parts.

4. The radio communication device as claimed in claim 1, wherein said first connection part comprises a socket connector and said second connection part comprises a pin connector.

5. The radio communication device as claimed in claim 1, wherein said radio modem and said case include Personal Computer Memory Card International Association (PCMCIA) connection terminals which are used during one of a display message mode and a delete message mode to communicate between said radio modem and said case.

6. The radio communication device as claimed in claim 5, wherein unused connectors of said PCMCIA connection terminals are selected for communication between said radio modem and said case.

7. A radio communication device combinable with a radio modem for a computer having a first connection part to connect with said computer, comprising:

a second connection part electrically connectable to said first connection part when said radio modem is separated from said computer; and a controller for receiving a signal from said radio modem via said first and second connection parts and for controlling said radio modem through said first and second connection parts, wherein said radio communication device is other than a general-purpose computer.

8. The radio communication device as claimed in claim 7, said radio communication device further comprising:

an informing means for informing a user of a signal reception;

a display for displaying a received message.

9. The radio communication device as claimed in claim 7, wherein said radio communication device automatically goes into a signal receiving mode in response to connection of said radio modem to said radio communication device.

10. The radio communication device as claimed in claim 7, wherein said radio modem and said radio communication device include Personal Computer Memory Card International Association (PCMCIA) connection terminals which are used during one of a display message mode and a delete message mode to communicate between said radio modem and said radio communication device.

11. The radio communication device as claimed in claim 7, further comprising:

deleting means for deleting said received message stored in a memory of said radio modem.

12. The case as claimed in claim 11, further comprising:

deleting means for deleting said message stored in said memory of said radio modem.

13. A case combinable with a radio modem for a computer, said radio modem being operative to receive a calling signal and to store a received message in a memory therein, said modem being installed in said case when said radio modem is separated from said computer, the case comprising:

receiving means for receiving said calling signal from said radio modem; and a display for displaying a message included in said calling signal, wherein the case is other than a general-purpose computer, and wherein said case and said radio modem automatically go into a signal receiving mode in response to connection of said radio modem to said case.

14. The radio communication device as claimed in claim 13, wherein said radio modem and said case include Personal Computer Memory Card International Association (PCMCIA) connection terminals which are used during one of a display message mode and a delete message mode to communicate between said radio modem and said case.

15. A radio communication device having a first portion and a second portion, said first portion including a first connection part, said second portion including a second connection part, said first connection part and said second connection part being connectable electrically when said first portion is separated from a computer, said first portion comprising:

first receiving means for receiving a calling signal including a calling number and a message;

memory means for storing said message when said calling number coincides with an assigned calling number; and first control means for supplying said message to said second portion through said first and second connection parts;

said second portion comprising:

second receiving means for receiving said message from said first control means;

second control means for deleting said message stored in said memory means; and display means for displaying said message, wherein said second portion is other than a general-purpose computer.

16. The radio communication device as claimed in claim 15, wherein said first connection part and said second connection part comprise Personal Computer Memory Card International Association (PCMCIA) connection terminals which are used during one of a display message mode and a delete message mode to communicate between said first portion and said second portion.

17. A method for controlling a message display of a radio communication device, said radio communication device including a radio modem which receives a calling signal and stores a message signal within said calling signal, and a case which displays said message and which is other than a general-purpose computer, said radio modem and said case being electrically connectable when said radio modem is not connected to a computer, the method comprising the steps of:

detecting that said radio modem is connected to said case electrically;

controlling said radio communication device, such that said radio communication device automatically goes into a signal receiving mode when said radio modem is connected to said case electrically;

storing said received message signal included in said calling signal;

sending said received message signal to said case; and displaying said received message signal on said display.

18. The method according to claim 17, wherein said radio modem and said case include Personal Computer Memory Card International Association (PCMCIA) connection terminals, the method further comprising the step of:

using said PCMCIA connection terminals to communicate between said case and said modem during one of a display message mode and a delete message mode.

19. A method for controlling a message deletion stored in a memory of a radio communication device, said radio communication device including a radio modem which receives a calling signal and stores a message signal included in said calling signal into said memory, and a case which is other than a general-purpose computer and which has a display for displaying said message and has an operating portion, said radio modem and said case being electrically connectable when said radio modem is not connected to a computer, the method comprising the steps of:

detecting a first operation of said operating portion;

sending a first control signal from said case to said radio modem in response to said first operation detecting step; sending said message stored in said memory to said case in response to said first control signal;

displaying said message on said display;

detecting a second operation of said operating portion; and deleting said message displayed on said display from said memory in response to said second operation detecting step.

20. The method according to claim 19, further comprising the step of:

automatically entering a signal receiving mode after detecting that said radio modem is connected to said case.

21. The method according to claim 19, wherein said radio modem and said case include Personal Computer Memory Card International Association (PCMCIA) connection terminals, the method further comprising the step of:

using said PCMCIA connection terminals to communicate between said case and said modem during one of a display message mode and a delete message mode.

22. A method of operating a computer-compatible modem which is detachably connectable to a computer, the method comprising the steps of:

connecting said computer and said modem;

detaching said modem from said computer;

receiving signals by the detached modem and saving messages;

at least one of (a) connecting said modem to a portable case, which is other than a general-purpose computer, having a display and displaying stored messages; and (b) connecting the modem to said computer; and detecting the stored messages in said computer; and automatically entering a signal receiving mode after detecting that said radio modem is connected to said case.

23. The method of operating a computer-compatible modem as claimed in claim 22, wherein said connecting step is followed by a detecting step.

24. A radio communication device, comprising:

a radio modem for a computer having a first connection part electrically connectable to said computer; and a case having a second connection part electrically connectable to said first connection part of said radio modem when said radio modem is separated from said computer, wherein said case is other than a general-purpose computer;

wherein said radio modem and said case operate as said radio communication device when said radio modem and said case are connected electrically, and wherein said case comprises:

an operating portion;

informing means for informing a user of a signal reception;

a display for displaying a received message;

a controller for controlling said radio modem based on an operation of said operating portion and for supplying a signal from said radio modem to said informing means and said display via said first and second connection parts.

25. The radio communication device as claimed in claim 24, wherein said radio modem comprises:

a radio section for receiving a radio signal;

a decoder for decoding said radio signal to a decoded signal, a first memory for storing an assigned calling number;

a second memory for storing said received message included in said decoded signal; and a CPU for comparing a received calling number included in said decoded signal with said assigned calling number and for communicating with said controller in said case via said first and second connection parts.

26. The radio communication device as claimed in claim 25, said case further comprising:

deleting means for deleting said received message in said second memory in response to said operation of said operating portion.

27. The radio communication device as claimed in claim 25, said radio modem further comprising:

an interface for said computer and for sending said decoded signal including said received message to said controller.

28. The radio communication device as claimed in claim 24, said case further comprising:

a battery for supplying a power to each circuit in said case and said modem.

29. A radio communication device having a first portion and a second portion, said first portion including a first connection part, said second portion including a second connection part, said first connection part and said second connection part being connectable electrically when said first portion is separated from a computer, said first portion comprising:

first receiving means for receiving a calling signal including a calling number and a message;

memory means for storing said message when said calling number coincides with an assigned calling number; and first control means for supplying said message to said second portion through said first and second connection parts;

said second portion comprising:

second receiving means for receiving said message from said first control means; and display means for displaying said message, wherein said second portion is other than a general-purpose computer, and wherein said radio communication device automatically goes into a signal receiving mode in response to connection of said first connection part to said second connection part.

30. A method of operating a computer-compatible modem which is detachably connectable to a computer, the method comprising the steps of:

connecting said computer and said modem;

detaching said modem from said computer;

receiving signals by the detached modem and saving messages;

at least one of (a) connecting said modem to a portable case, which is other than a general-purpose computer, having a display and displaying stored messages; and (b) connecting the modem to said computer; and detecting the stored messages in said computer; and using PCMCIA connection terminals to communicate between said case and said modem during one of a display message mode and a delete message mode.

* * * * *